July 5, 1927.

W. A. CHRYST

ENGINE STARTING APPARATUS

Filed Aug. 27, 1925

Inventor
William A. Chryst
By Spencer, Duvall & Hardman
his Attorneys

Patented July 5, 1927.

1,634,738

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

ENGINE-STARTING APPARATUS.

Application filed August 27, 1925. Serial No. 52,928.

This invention relates to engine starting apparatus, and more particularly to the type of apparatus shown in my copending application Serial No. 16.206, filed March 17, 1925. That application discloses an engine starting apparatus including an electric motor which operates a shaft supporting a gear which is movable endwise along the shaft into engagement and out of engagement with the gear of an engine to be started. The motor gear is connected with the motor shaft through an overrunning clutch, one member of which has a splined connection with the motor shaft, so that the clutch can be moved endwise to move the motor gear endwise into mesh with the engine gear. The other member of the clutch is provided with external splines for receiving the internal splines of the motor gear, so that the clutch may slide relative to the motor gear, as well as impart rotation to the latter by the operation of the motor. Endwise motion from the clutch to the motor gear is imparted through a spring which will yield in case the motor gear collides with the teeth of the engine gear before going into mesh, so that the lever which is used to move the clutch endwise along the motor shaft, may be moved sufficiently to close the motor switch so that the motor may turn slightly to register the motor gear with the engine tooth spaces; whereupon the said spring will be released to snap the motor gear into mesh with the engine gear.

One of the objects of the present invention is to modify apparatus of the type referred to, in order that a motor gear having a relatively small number of teeth may be used.

Further objects and advantages of the present invention will be apparent from the following description, reference being had to the accompanying drawings, wherein a preferred form of the present invention is clearly shown.

Figure 1:
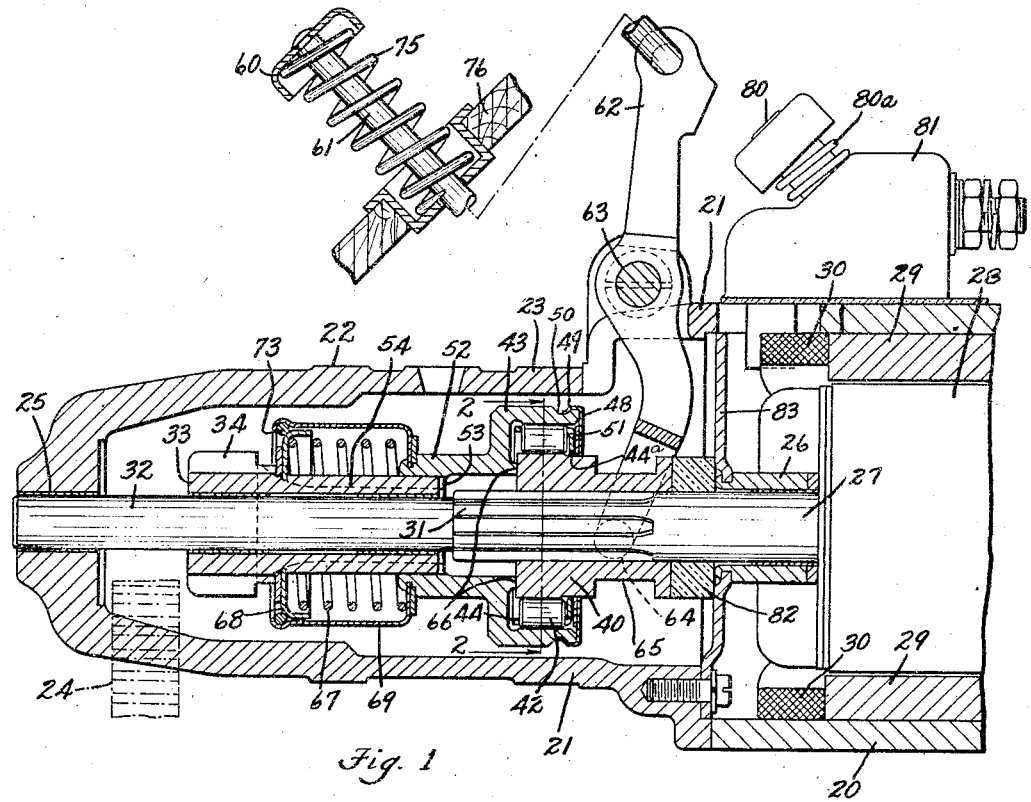
Fig. 1 is a fragmentary longitudinal sectional view of the starting motor having the form of the invention.

Referring particularly to Fig. 1, 20 designates the motor field frame having attached thereto by means, (not shown), an end frame constituting a gear housing 21 and having cylindrical bosses 22 and 23 which are received by a cylindrical opening in an engine frame which houses an engine gear 24, indicated by a dot-and-dash line. The frame 21 carries bearings 25 and 26 for supporting the armature shaft 27 of the motor. Shaft 27 carries an armature 28 which revolves between pole pieces 29 surrounded by field windings 30.

Figure 2:
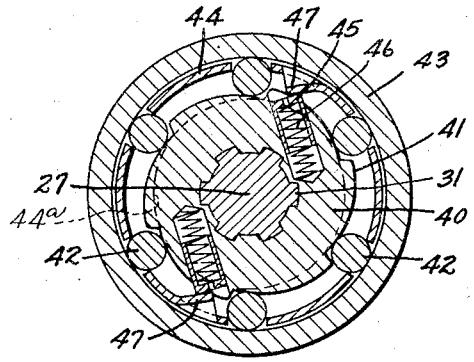
Fig. 2 is a sectional view on line 2—2 of Fig. 1.

The shaft 27 is provided with splines 31 and a portion 32 of reduced diameter journaled in the bearing 25, and providing a journal for the hub 33 of a motor gear 34 which moves endwise along the shaft 27 into and out of engagement with the engine gear 24. Splines 31 cooperate with splines provided internally of a driving clutch member 40 having camming surfaces 41 which cooperate with rollers 42, which in turn cooperate with the interior cylindrical surface of a clutch shell 43 or overrunning clutch member. The rollers 42 are maintained in spaced relation by a cage 44, and cage 44 is yieldingly urged in a counter-clockwise direction, as shown in Fig. 2, relative to the members 40 and 43, by plungers 45 which are urged by springs 46 against lugs 47 which are formed integrally with the cage 44. Obviously, clockwise rotation of the clutch member 40 will cause the clutch shell 43 to be driven through the rollers 42. The spring-urged cage 44 causes the rollers 42 to be located relative to the camming surfaces 41 and the interior cylindrical surface of the shell 43, so that the instant the member 40 starts to drive in a clockwise direction, the rollers will be immediately gripped by the camming surfaces and the interior of the shell. The diameter of the hub 44ª of the cage 44 is less than twice the greatest distance from the axis of shaft 27 to the surfaces 41, hence, clutch member 40 can not be moved toward the right, as viewed in Fig. 1, without moving the cage 44. Thus, endwise movement of the clutch member 40 relative to the shell 43 in one direction is prevented by a washer 48 having a central opening for receiving the clutch member 40 and a flange 49, which is spun into a groove 50 provided on the exterior of the clutch shell 43. A spacing washer 51 is located between the washer 48 and the cage 44.

The clutch shell 43 is provided with a hub 52 which is internally splined at 53 to receive the external splines 54 which are provided by the hub 33 of the motor gear 34. It is, therefore, apparent that the motor gear 34 is driven by the shaft 27 through the splines 31 which drive the internal splines of the clutch member 40, through the clutch members 40, 42 and 43, and through the splined connection between the hub 52 of member 43 and the hub 33 of gear 34.

Endwise motion toward the left in Fig. 1, of the clutch 41 is imparted by a pedal 60 which is connected by a rod 61 with a lever 62 which is supported by a shaft 63 carried by the frame 21. The lower end of the lever 62 is bifurcated and each branch carries a stud or roller 64 which is received by an annular groove 65 in the hub of the clutch member 40. Endwise motion is imparted from the member 40 to the member 43 by engagement of end faces of said members, indicated by numeral 66.

Figure 3:
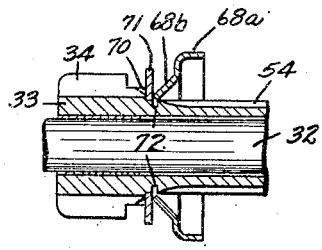
Figs. 3 and 4 are longitudinal sectional views showing the manner of attaching a flanged ring to one of the parts of the starting apparatus.
Figure 4:
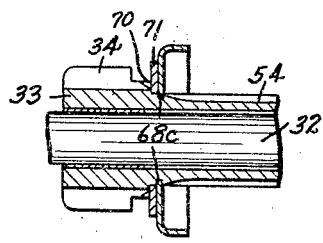

Endwise motion is imparted from the member 43 to the gear 34 by a spring 67 which is located between cupped washers 68 and 69 attached, respectively, to the hub 33 of gear 34, and to hub 52 of clutch member 43. A manner of attaching these cup-shaped washers to their respective hubs is indicated in Figs. 3 and 4. The washer 68 is formed as indicated by numeral 68ª in Fig. 3, which shows that the central opening of the washer is surrounded by a flange 68ᵇ which is frusto-conical in shape. The central hole within the flange 68ᵇ is slightly larger in diameter than the hub 33. The gear 34 is provided with a shoulder 70 for receiving a relatively stiff backing washer 71 which is located immediately adjacent a groove 72 in the hub 33 having a width slightly larger than the thickness of the metal in the washer 68. To change the shape of the washer 68 from that shown in Fig. 3 to that shown in Fig. 4, it is forced against the backing washer 71. The diameter at the bottom of the groove 72 is made such as to receive the flange 68ᵇ when it has been changed from the shape shown in Fig. 3 to the shape shown in Fig. 4,—the flange having entered the groove 72 as indicated at 68ᶜ. The cup-shaped washer 69 is attached to the hub 52 in a similar manner.

The spring 67 is in an initial state of compression, and separation of the cup washers 68 and 69 is prevented by a wire split ring 73 which is received by a suitable groove adjacent the left-hand end of the washer 69.

To start an engine with the apparatus described, the pedal 60 is pressed downwardly, causing the lever 62 to move clockwise to impart endwise movement, to the left in Fig. 1, to the gear 34, causing it to mesh with the gear 24. The lever 62 cooperates with the plunger 80 of an electric switch 81 for connecting the motor with a current source, whereupon the motor operates to rotate the shaft 27 and gear 34 through the connections described. When the engine becomes self-operative, the gear 24 will be operated at a higher speed than the shaft 27 is operated by the motor. Then the clutch member 43 will overrun the clutch member 40, by reason of the construction described. After the engine is started, the operator will release the pedal, whereupon the spring 75 located between the pedal 60 and the floorboard 76 of the automobile, will be released to cause the lever 62 to move counterclockwise in order to retract the gear 34 from the engine gear 24. A spring 80ª causes the switch 81 to be opened.

In case teeth of the gear 34 should collide with the end faces of the gear 24 before going into mesh, the spring 67 will yield to allow the lever 62 to engage the switch plunger 80 and move it into circuit-closing position. When this occurs, the motor will turn the shaft 27 to rotate the gear 34 into registration with the tooth spaces of the gear 24, whereupon the spring 67 will quickly snap the gear 34 into mesh with the gear 24.

The motor gear 34 is quickly brought to rest, after the pedal 60 is released by a friction disc 82 which is located between the right end of the clutch member 40 and a frame 83 which supports the bearing 26.

It is apparent from Fig. 1 and the description thereof, that the starting apparatus permits the use of a motor gear having a relatively small number of teeth which is necessary when it is desired to obtain a low cranking gear ratio, thereby permitting the use of a relatively small motor. This result is brought about by providing the motor gear with a hub for receiving the splines which slidingly engage internal splines in the hub of the overrunning clutch member. The gear splines are, therefore, spaced from the gear teeth, so that the metal directly under the gear teeth will not be weakened by the splines. Consequently, the diameter of the motor gear may be reduced without being limited by the presence of splines cut through the metal of the gear in the plane of the gear teeth.

While the form of embodiment of the invention as herein disclosed, constitutes a preferred form, it is to be understood that other forms might be adopted, all coming within the scope of the claims which follow.

What is claimed is as follows:

1. Engine starting apparatus comprising, in combination, an electric motor, a shaft driven by the motor, a clutch having a member driven by the shaft, and slidable endwise thereon and an overrunning member having a tubular part provided with splines on the interior thereof, a gear adapted to move endwise along the shaft into mesh with a gear connected with the engine to be started and having a hub externally splined to cooperate with the splines of the overrunning clutch member, means including a spring for transmitting endwise motion from the clutch to the motor gear, a motor switch, and means for moving the clutch and gear and for closing the switch.

2. Engine starting apparatus comprising, in combination, an electric motor, a splined shaft driven by the motor, a driving clutch member internally splined to cooperate with the shaft splines and having an annularly grooved hub, an overrunning driven clutch member having a tubular hub provided with splines on the interior thereof, a gear adapted to move endwise along the shaft into mesh with a gear connected with the engine to be started and having a hub externally splined to cooperate with the splines of the overrunning clutch member, means including a spring for transmitting endwise motion from the clutch to the motor gear, a motor switch, and means including a lever cooperating with the grooved hub of the driving clutch member for moving the clutch and motor gear endwise and for closing the switch.

3. Engine starting apparatus comprising, in combination, a motor, a shaft driven by the motor, an overrunning clutch including a shell member, a cam member within the shell and rollers between the clutch members, said cam member being connected with the shaft for rotation with the shaft and sliding movement thereon, an internally splined tubular part connected with the clutch shell and slidable along the shaft, a pinion adapted to mesh with a gear of the engine to be started and having an externally splined hub cooperating with the tubular part of the clutch shell, a spring surrounding the shaft and located between the clutch and pinion for transmitting motion from the clutch to the pinion in one direction, means surrounding spring for transmitting motion from the clutch to the pinion in the opposite direction, a motor switch, and means for closing the switch and moving the clutch and pinion, said spring yielding in case of pinion tooth abutment to permit closing the motor switch.

In testimony whereof I hereto affix my signature.

WILLIAM A. CHRYST.